US008768622B2

(12) United States Patent
Healy

(10) Patent No.: US 8,768,622 B2
(45) Date of Patent: Jul. 1, 2014

(54) SYSTEM AND METHOD FOR MANEUVER PLAN FOR SATELLITES FLYING IN PROXIMITY USING APOCENTRAL COORDINATE SYSTEM

(71) Applicant: Liam M. Healy, Washington, DC (US)

(72) Inventor: Liam M. Healy, Washington, DC (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 14/028,495

(22) Filed: Sep. 16, 2013

(65) Prior Publication Data

US 2014/0077036 A1  Mar. 20, 2014

Related U.S. Application Data

(60) Provisional application No. 61/700,982, filed on Sep. 14, 2012.

(51) Int. Cl.
*B64G 1/10* (2006.01)
*B64G 1/24* (2006.01)

(52) U.S. Cl.
CPC . *B64G 1/242* (2013.01); *B64G 1/24* (2013.01)
USPC ........ 701/531; 701/13; 244/158.4; 244/158.8

(58) Field of Classification Search
CPC .............................. B64G 1/007; B64G 1/1078
USPC ............ 701/13, 158.5, 531; 244/158.4, 158.8
See application file for complete search history.

(56) References Cited

U.S. PATENT DOCUMENTS

| 4,657,210 | A | * | 4/1987 | Hubert et al. | 244/158.5 |
|---|---|---|---|---|---|
| 4,943,014 | A | * | 7/1990 | Harwood et al. | 244/158.5 |
| 5,082,211 | A | * | 1/1992 | Werka | 244/158.2 |
| 5,124,925 | A | * | 6/1992 | Gamble et al. | 701/531 |
| 5,160,935 | A | * | 11/1992 | Inamiya | 342/357.31 |
| 5,163,641 | A | * | 11/1992 | Yasaka | 244/164 |
| 5,186,419 | A | * | 2/1993 | Scott | 244/171.3 |
| 5,193,766 | A | * | 3/1993 | Kawano et al. | 244/172.4 |

(Continued)

OTHER PUBLICATIONS

Healy, L.M., and Henshaw, C.G., "Passively safe relative motion trajectories for on-orbit inspection", AAS 10-265, Proceedings of the AAS/AIAA Space Flight Mechanics Meeting held Feb. 14-17, 2010, San Diego, CA, vol. 136, Part 1, pp. 2439-2458, (Oct. 2010).

(Continued)

*Primary Examiner* — John R Olszewski
*Assistant Examiner* — Mohsen Ghajargar
(74) *Attorney, Agent, or Firm* — US Naval Research Laboratory; Sally A. Ferrett

(57) ABSTRACT

A technique to assist guidance techniques for a free-flying inspection vehicle for inspecting a host satellite. The method solves analytically in closed form for relative motion about a circular primary for solutions that are non-drifting, i.e., the orbital periods of the two vehicles are equal, computes the impulsive maneuvers in the primary radial and cross-track directions, and parameterizes these maneuvers and obtain solutions that satisfy constraints, for example collision avoidance or direction of coverage, or optimize quantities, such as time or fuel usage. Apocentral coordinates and a set of four relative orbital parameters are used. The method separates the change in relative velocity (maneuvers) into radial and crosstrack components and uses a waypoint technique to plan the maneuvers.

22 Claims, 6 Drawing Sheets

(56) References Cited

U.S. PATENT DOCUMENTS

| | | | | |
|---|---|---|---|---|
| 5,242,135 | A * | 9/1993 | Scott | 244/171.3 |
| 5,299,764 | A * | 4/1994 | Scott | 244/172.5 |
| 5,681,011 | A * | 10/1997 | Frazier | 244/164 |
| 5,806,801 | A * | 9/1998 | Steffy et al. | 244/158.6 |
| 5,806,802 | A * | 9/1998 | Scott | 244/172.4 |
| 5,810,297 | A * | 9/1998 | Basuthakur et al. | 244/158.8 |
| 5,961,077 | A * | 10/1999 | Koppel et al. | 244/158.5 |
| 5,979,830 | A * | 11/1999 | Kellermeier | 244/158.8 |
| 6,059,233 | A * | 5/2000 | Koppel et al. | 244/158.5 |
| 6,102,334 | A * | 8/2000 | Claffey et al. | 244/158.5 |
| 6,213,432 | B1 * | 4/2001 | Koppel | 244/158.5 |
| 6,233,507 | B1 * | 5/2001 | May | 701/13 |
| 6,253,124 | B1 * | 6/2001 | Belbruno | 701/13 |
| 6,305,646 | B1 * | 10/2001 | McAllister et al. | 244/158.8 |
| 6,315,248 | B1 * | 11/2001 | Rockwell | 244/158.5 |
| 6,327,523 | B2 * | 12/2001 | Cellier | 701/13 |
| 6,389,336 | B2 * | 5/2002 | Cellier | 701/13 |
| 6,484,973 | B1 * | 11/2002 | Scott | 244/172.5 |
| 6,845,950 | B1 * | 1/2005 | Goodzeit et al. | 244/158.6 |
| 6,999,860 | B2 * | 2/2006 | Belbruno | 701/13 |
| 7,113,851 | B1 * | 9/2006 | Gelon et al. | 701/13 |
| 7,480,506 | B2 * | 1/2009 | Wang | 455/427 |
| 7,918,420 | B2 * | 4/2011 | Ho | 244/169 |
| 8,096,511 | B2 * | 1/2012 | Frenkiel et al. | 244/158.4 |
| 8,439,312 | B2 * | 5/2013 | Ho et al. | 244/169 |
| 8,567,725 | B2 * | 10/2013 | Wright | 244/171.7 |
| 8,628,044 | B2 * | 1/2014 | Poulos | 244/172.4 |
| 2005/0258311 | A1 * | 11/2005 | Scott | 244/172.4 |
| 2007/0179685 | A1 * | 8/2007 | Milam et al. | 701/3 |
| 2007/0228220 | A1 * | 10/2007 | Behrens et al. | 244/172.5 |
| 2007/0250267 | A1 * | 10/2007 | Jaeger et al. | 701/226 |
| 2007/0285304 | A1 * | 12/2007 | Cooper | 342/62 |
| 2009/0132105 | A1 * | 5/2009 | Paluszek et al. | 701/13 |
| 2010/0006704 | A1 * | 1/2010 | Sainct et al. | 244/158.4 |
| 2011/0036951 | A1 * | 2/2011 | Moorer et al. | 244/158.6 |
| 2011/0036952 | A1 * | 2/2011 | Moorer et al. | 244/158.6 |
| 2011/0144835 | A1 * | 6/2011 | Ho | 701/13 |

OTHER PUBLICATIONS

Healy, L.M., and Henshaw, C.G., "Formation maneuver planning for collision avoidance and direction coverage", AAS-12-102, Proceedings of the AAS/AIAA Space Flight Mechanics Meeting held Jan. 29-Feb. 2, 2012, Charleston, SC, vol. 143, Part, pp. 25-44, (Jul. 2012).

Scharf, D.P., Hadaegh, F.Y., and Kang. B.H., "A survey of spacecraft formation flying guidance and control (Part I): Guidance", Proceedings of the 2003 American Control Conference, Denver, CO, USA, Jun. 2003, pp. 1733-1739.

Scharf, D.P., Hadaegh, F.Y., and Ploen, S.R., "A survey of spacecraft formation flying guidance and control (Part II): Control", Proceedings of the 2004 American Control Conference, Boston, CO, USA, Jun. 2003, pp. 2976-2985.

Sabot, C., Burns, R. And McLaughlin, C.A., "Satellite Formation Flying Design and Evolution", Journal of Spacecraft and Rockets, Mar.-Apr. 2001, vol. 38, No. 2, pp. 270-278.

* cited by examiner

SYSTEM AND METHOD FOR MANEUVER PLAN FOR SATELLITES FLYING IN PROXIMITY USING APOCENTRAL COORDINATE SYSTEM

CROSS-REFERENCE TO RELATED APPLICATIONS

This Application is a nonprovisional under 35 USC 119(e) of, and claims the benefit of, U.S. Provisional Application 61/700,982 filed on Sep. 14, 2012, the entire disclosure of which is incorporated herein by reference.

BACKGROUND

1. Technical Field

The application is related to methods and systems for inspecting satellites with inspection vehicles that travel a path around the satellite to be inspected.

2. Related Technology

Artificial satellites in orbit around the earth can occasionally have problems that require a visual inspection to detect and diagnose. A small vehicle can be sent to move in a path around the satellite to take photographs and inspect or repair the larger satellite.

A satellite (the secondary) circumnavigating another satellite (the primary) in order to inspect it for possible damage or failure will be guided by two goals: first, to avoid collisions with the main satellite, and second, to pass through certain directions (or perhaps, all directions) from the primary from which it is desirable to have a view; a stuck deployable might be imaged for diagnosis and repair on the ground, or perhaps an all-over surface inspection is necessary. If the primary has a protuberance like an antenna or solar panel, and the inspection needs to be at a close distance (on the order of meters), then it may be necessary to have a complicated trajectory in order to meet both conditions. Techniques for planning trajectories for orbital maneuvering have been used successfully for many years, but these techniques do not generally deal with obstacle avoidance. In the last decade, however, spacecraft proximity operations has increased in importance, and consequently techniques for safely operating spacecraft in close proximity to each other have been developed.

Some of these techniques have taken classical astrodynamics as their starting point. Such algorithms typically aim to produce either natural motion trajectories (governed primarily by orbital dynamics) or forced motion trajectories (governed primarily by on-board spacecraft thrusting) that maintain enough distance between the co-orbiting bodies that collisions are impossible. Implicit in this approach is that the co-orbiting bodies' geometry is unimportant; essentially, the bodies are treated as spheres that circumscribe the real geometry of the spacecraft in question. A collision-free trajectory is then one in which the circumscribing spheres do not intersect. This approach has many advantages.

In contrast, the terrestrial robotics community has treated trajectory planning very differently. Robotic trajectory planning is typically concerned with finding collision-free trajectories in highly cluttered or confined environments; one canonical trajectory planning problem in terrestrial robotics entails a mobile vehicle operating inside an office building. Trajectory planning for spacecraft proximity operations based on the classic terrestrial robotics approach thus have the ability to plan much closer maneuvers than those based on classic astrodynamics.

Some approaches are described in U.S. Patent Application Publication No. 2007/0179685 to Milam et al. and 2009/0132105 to Paluszek et al.

Relative motion about a primary in circular orbit in terms of centered relative orbital objects is described in L. M. Healy and C. G. Henshaw, "Passively safe relative motion trajectories for on-orbit inspection", AAS 10-265, pp. 2439-2458, (2010), the entire disclosure of which is incorporated herein by reference.

DETAILED DESCRIPTION OF EMBODIMENTS OF THE INVENTION

The system and method described herein determines the maneuvers needed to keep an inspector vehicle close to the host without colliding while being able to inspect the desired faces (directions from the center) of the host. The purpose of this might be to inspect the antenna that will not deploy on a satellite, and potentially to repair the broken antenna with the secondary or inspection vehicle. Additional information is disclosed in "Formation maneuver planning for collision avoidance and direction coverage", AAS/AIAA Space Flight Mechanics Meeting, AAS 12-102, (2012), the entire disclosure of which is incorporated herein by reference.

Figure 1:
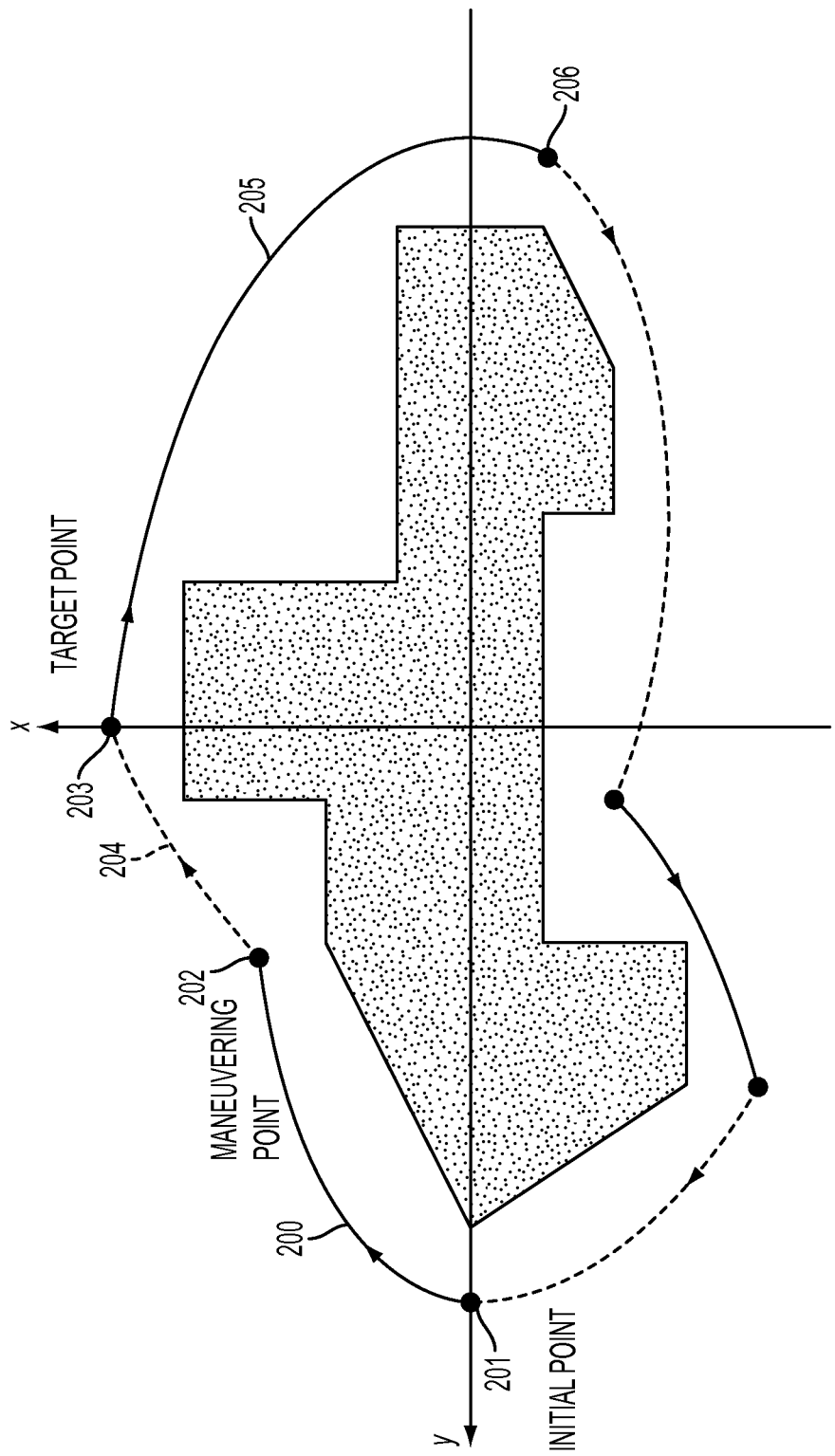
FIG. 1 illustrates a cross sectional view of a satellite with protrusions and obstacles to be avoided during an inspection by an inspection or secondary vehicle.

FIG. 1 illustrates a cross section of a host spacecraft 100 or "primary" having an irregular shape. The protrusions 102, 104 on the spacecraft 100 present obstacles that must be avoided during the inspection maneuver. These protrusions can be solar panels, antenna, or other components. The "secondary" or inspection vehicle moves around the primary to inspect the primary. The method has three goals: to maneuver the inspection vehicle close to the host vehicle, to avoid colliding with obstacles, and to minimize fuel usage.

The method uses apocentral coordinates and a set of four constants of the motion that parameterize the relative orbit. The method solves a periodic three-point boundary value problem relative motion about a circular orbit without perturbations. This finds, given a pair of points relative to the primary body, an orbit that connects them.

FIG. 1 shows a trajectory of a secondary that includes a sequence of such natural motion segments connected at points at which an impulsive thrust is executed, and the value of that thrust can be computed by taking the vector difference of the velocities at these common points. At an initial time, the vehicle moves along its orbital path 200 from an initial point 201 to a maneuver waypoint 202. At the maneuvering waypoint 202, thrust is applied to move the vehicle to a target waypoint 203 along a path 204. The vehicle will continue to move along the same path 204 until a new thrust is applied, which will move the vehicle along a new orbital path 205 to a new point 206. This alternating sequence continues, with the secondary moving relative to the primary in a path that brings the secondary close to the primary without collision and while meeting other user-selected constraints.

Figure 2:
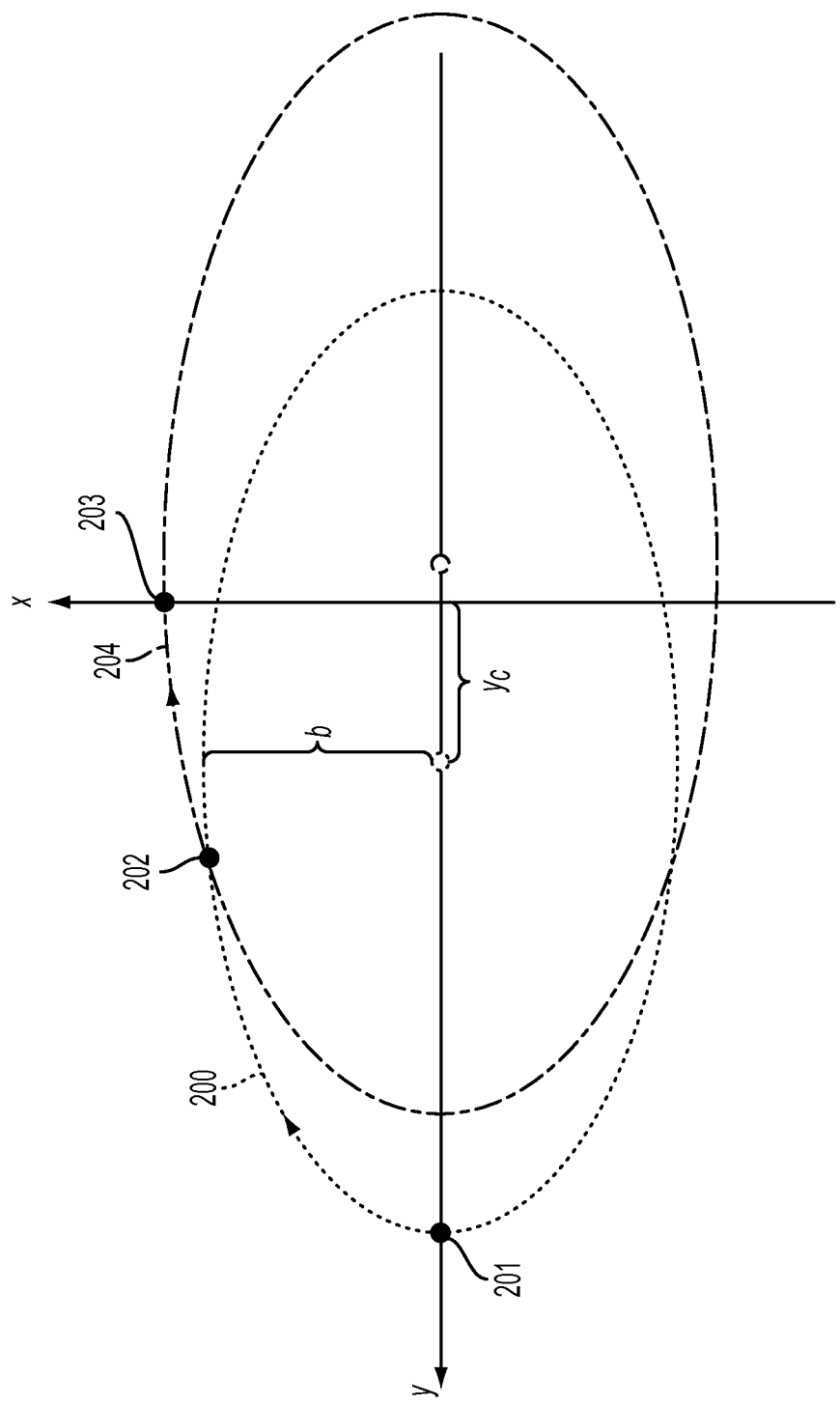
FIG. 2 illustrates motion of the inspection vehicle from an initial point to a maneuver waypoint, subsequent motion to a target waypoint due to application of thrust at the maneuver waypoint.

Note that FIGS. 1 and 2 show projections of orbit segments of the secondary, existing in three-dimensional space, onto the two-dimensional primary orbital plane (the plane of orbit of the primary 100).

The maneuvers have only radial and cross-track components; by having no in-track component, the motion stays periodic about the primary, i.e., the spacecraft have identical semimajor axes and thus orbital periods. Two satellites orbiting closely with the same semimajor axis will stay together over an extended time if no perturbations or other forces are acting on them; the figure of motion of one relative to another will be an ellipse or degenerate ellipse centered somewhere along the track of the primary Any propulsion in the in-track (inertial velocity) direction will cause a change in the semimajor axis, so unless executed identically on both satellites will cause the formation to come apart.

Therefore, any maneuvers executed with the intent of maintaining the stability of the formation (but not necessarily the configuration) should have components only in the radial and cross-primary-plane directions; if propulsion fails or is incorrect, the formation will still stay together.

This strategy reduces the free variables in the optimal and feasible trajectory planning problem, and thereby solutions are easier to obtain. Furthermore, collision avoidance is much easier to confirm geometrically. A possible disadvantage is that by excluding possible solutions, an optimal solution might be missed. However, the advantages are believed to outweigh the disadvantages, and in realistic relative orbit schemes, a solution found with this method with these constraints will be preferred for practical purposes.

FIG. 2 shows the initial orbital path 200 and a post maneuver orbital path 204 before and after a maneuver at the maneuver waypoint 201 (r1), and the two ellipses of the orbital paths 200 and 204, projected into the orbital plane of the primary.

A purely radial maneuver will shift the relative motion ellipse forward or backward in the in-track direction, and change the scale of the ellipse. This affects two of the four parameters, the in-track center $y_c$ of the secondary's current orbital path 200, and the scale, represented by the semiminor axis b of the relative ellipse of the secondary's current orbital path 200 projected to the orbital plane of the primary. A cross-track maneuver will change the relative orbital plane, as defined by the amplitude ratio η and the phase difference Ξ. The parameters $y_c$ and b are shown graphically in FIG. 2.

A potential obstacle on the initial path can be identified by looking at a cross section of the primary in the relative orbital plane. There are two ways to do find a safe path if there is an obstacle: enlarge the orbit, which preserves the plane, or change the plane, which will change the eccentricity and size of the ellipse and also the cross-section of the primary The change in plane may change the direction of view. Within the constraints of collision avoidance and desired viewing direction, there are many possible trajectories, as defined by location of maneuver points and value of delta-V at those points. Therefore, additional objective functions such as fuel consumption (proportional to the magnitude of delta-V) or transfer time maybe optimized or at least considered.

This approach is different than the customary approach to this problem. Instead of applying a complete optimal path planner to the full dynamics problem, it is chosen to decompose the problem by developing a deep understanding of the dynamics. This knowledge is applied to both give an intuitive understanding to possible trajectories, and to reduce the number of degrees of freedom, so that when an optimizer is finally applied, it is far more likely that it will converge quickly to a satisfactory result.

The work presented here helps to solve problems of relative orbital guidance for proximity operations. Daniel P. Scharf, Fred Y. Hadaegh, and Scott R. Ploen, "A survey of spacecraft formation flying guidance and control (Part I): Guidance", American Control Conference, Denver, Colo., USA, June 2003, provides an overview of the subject in the context of space robotics. T. Lovell and S. Tragesser, "Guidance for relative motion of low earth orbit spacecraft based on relative orbit elements", AIAA/AAS Astrodynamics Specialist Conference. AIAA, 2004, AIAA-2004-4988, addresses relative orbital guidance for different applications, and some of the quantities used herein have analogues in their work. Mullins used the Hill's state-transition matrix to solve the free-time boundary value problem including drift and drag for circular reference orbits, as described in Mullins, L. D., "Initial value and two point boundary value solutions to the Clohessy-Wiltshire equations", Journal of the Astronautical Sciences, Vol. 40, No. 4, pp. 487-501, October-December 1992. Jiang, Li, Baoyin, and Gao generalize his work and solve the free-time boundary value problem for elliptical orbits by solving the Lambert problem for each vehicle and then linearizing the time equation, using a Newton-Raphson method to solve the problem approximately, as discussed in Fanghua Jiang, Junfeng Li, Hexi Baoyin, and Yunfeng Gao, "Two-point boundary value problem solutions to spacecraft formation flying", Journal of Guidance, Control, and Dynamics, Vol. 32, No. 6, pp. 1827-1837, November-December 2009. The present approach described herein builds in periodic motion as a constraint and gives an exact analytic solution in closed form for relative motion about a circular orbit. Richards, Schouwenaars, How, and Feron use relative motion dynamics to formulate a mixed integer linear programming approach which provides minimum delta-V collision-free trajectories by numerical optimization, as described in Arthur Richards, Tom Schouwenaars, Jonathan P. How, and Eric Feron' "Spacecraft trajectory planning with avoidance constraints using mixed-integer linear programming", Journal of Guidance, Control, and Dynamics, Vol. 25, No. 4, pp. 755-764, 2002. Henshaw and Sanner used an optimal variational technique and the full gravitating-body orbit dynamics, as described in Carl Glen Henshaw and Robert Sanner, "Variational technique for spacecraft trajectory planning", Journal of Aerospace Engineering, Vol. 23, No. 3, pp. 147-156, July 2010. While fully general, in practice, solutions are difficult to obtain due to small basins of convergence. The entire disclosure of each of these documents is incorporated herein by reference.

An aspect of the invention is a method that finds a path plan of orbital motion of the secondary relative to the primary satisfying certain constraints such as waypoints or the equivalent through which the orbit must pass. These could also be lines from the primary center, for example, to specify a direction over which the secondary should pass to satisfy the need for some observation. An obstacle may be indicated as something the path should avoid by constructing waypoints around it that guide the secondary on a safe path.

A path plan will consist of alternating propagation without maneuvers and impulsive maneuvers with components in the radial and/or cross-track directions. This can be done in a passively safe way, so that if a maneuver fails to happen on schedule, there will be no collision, and a new maneuver to achieve the desired goal can be computed, if the propulsion becomes operational again. The trajectory is safe if the relative orbital ellipse clears the cross-section of the primary sliced by the relative orbit plane, with a band added for the radius of the secondary, plus a margin of safety.

Mathematically, the trajectory computation is a two-point periodic boundary value problem. That is, the method includes defining two points on the orbit, and then solving for the orbit between them, represented by the four parameters b, $y_c$, $\eta$, and $\Xi$. For example, in FIG. 2, the two points can be $r_0$ and $r_1$, or $r_1$ and $r_2$. The position (and velocity) at any point in time between the points may then be determined. That way, it is possible to confirm that obstacles from the primary shape are avoided by insuring that the position on a radial line in a given direction exceeds that of the primary's perimeter in that direction.

The propagations, during which no external force is applied, are interrupted by maneuvers. These maneuvers are presumed to be impulsive, or instantaneous, so that the secondary changes relative velocity at that instant, but not its position. The delta-V (the change in velocity, which is proportional to fuel used) that causes the maneuver can have a radial ($\hat{i}$) component or cross-track ($\hat{k}$) component, however, no component in the primary in-track direction ($\hat{j}$) is permitted because that would induce a secular separation of the spacecraft, unless counteracted. The following paragraphs will show how to find the magnitude of these components from the values of the relative position vectors at the departure waypoint and the target waypoint. Once the maneuver has been computed, it can be confirmed with propagation that the trajectory in fact does reach the target, and time obstacle avoidance can be confirmed. This chain of alternating propagation and maneuvers is represented schematically as shown in FIG. 1.

Apocentral Coordinates

Apocentral coordinates are discussed in L. M. Healy and C. G. Henshaw, "Passively safe relative motion trajectories for on-orbit inspection", AAS 10-265, pp. 2439-2458, (2010), the entire disclosure of which is incorporated herein by reference.

Figure 3:
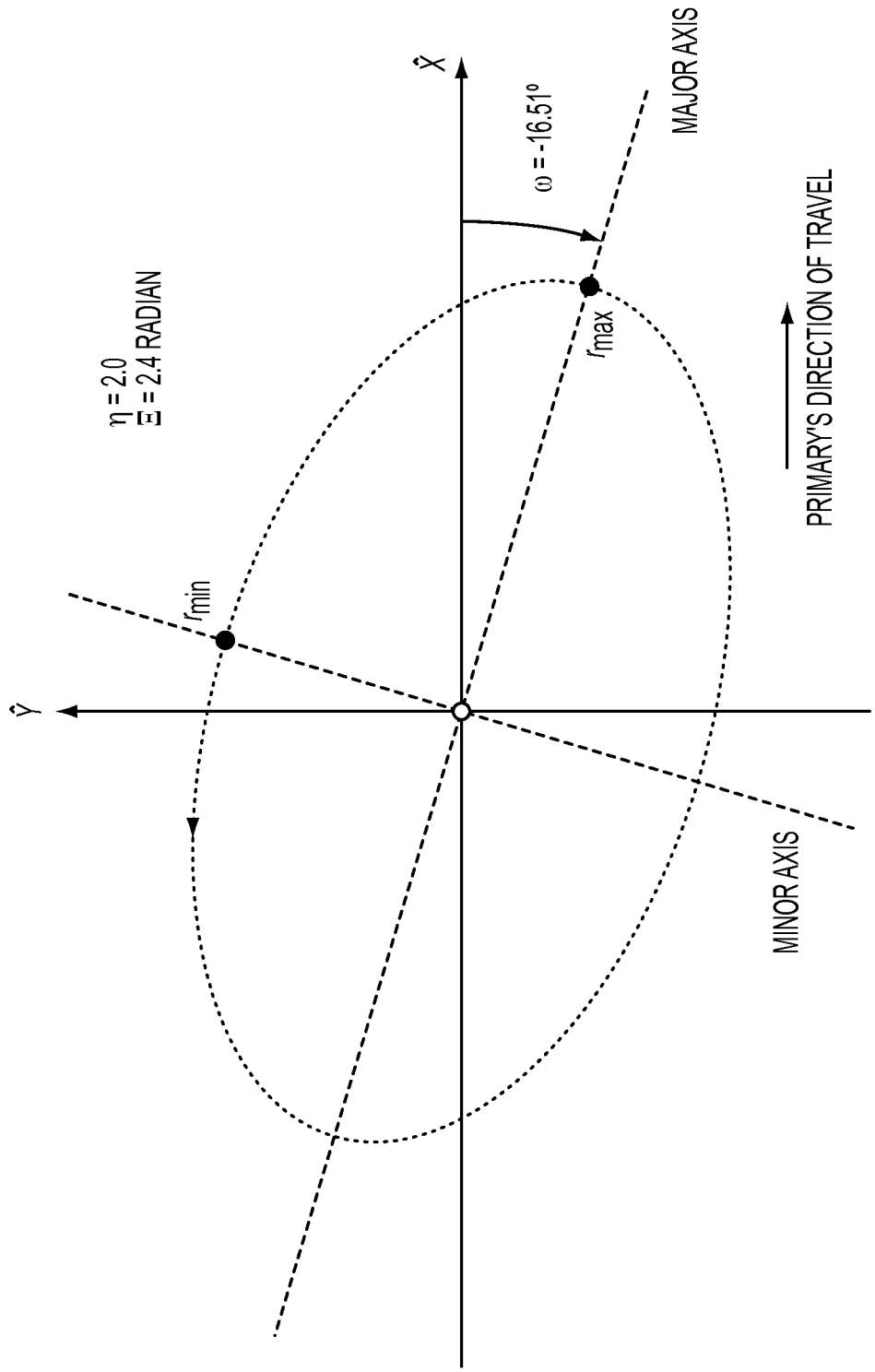
FIG. 3 illustrates a reference frame in which to describe the secondary's motion, having a radial component ($\hat{i}$ axis), an along-track component perpendicular to the radial and in the orbital plane ($\hat{j}$ axis), and a component perpendicular to the orbital plane parallel to the angular momentum ($\hat{k}$ axis).

Referring next to FIG. 3, the primary defines the RSW reference frame in which to describe the secondary's motion; it includes a radial component ($\hat{i}$ axis), an along-track component perpendicular to the radial and in the orbital plane ($\hat{j}$ axis), and a component that is perpendicular to the orbital plane parallel to the angular momentum ($\hat{k}$ axis). The components in the three directions are labeled x, y, and z respectively.

If it is assumed that the primary is in a circular orbit, Hill's equations have an analytic form as a function of time t:

$$x(t) = 4x_0 + \frac{2\dot{y}_0}{n} + \frac{\dot{x}_0}{n}\sin nt - \left(\frac{2\dot{y}_0}{n} + 3x_0\right)\cos nt \tag{1a}$$

$$y(t) = \frac{2\dot{x}_0}{n}\cos nt + \left(6x_0 + \frac{4\dot{y}_0}{n}\right)\sin nt - (6nx_0 + 3\dot{y}_0)t - \frac{2\dot{x}_0}{n} + y_0 \tag{1b}$$

$$z(t) = z_0 \cos nt + \frac{\dot{z}_0}{n}\sin nt \tag{1c}$$

$$\dot{x}(t) = \dot{x}_0 \cos nt + (3nx_0 + 2\dot{y}_0)\sin nt \tag{1d}$$

$$\dot{y}(t) = (6nx_0 + 4\dot{y}_0)\cos nt - 2\dot{x}_0 \sin nt - (6nx_0 + 3\dot{y}_0) \tag{1e}$$

$$\dot{z}(t) = \dot{z}_0 \cos nt - z_0 n \sin nt \tag{1f}$$

Initial conditions (t=0) are indicated with the subscript 0 (e.g. $x_0$, $y_0$) and the primary's mean motion is designated by n. In the periodic (non-drifting) case in which $x_c = 4x + 2\dot{y}/n = 0$, the secular term in time in y(t) is zero.

The motion of the secondary is that of an ellipse that lies in the relative orbital plane. The orientation, size, and eccentricity of the ellipse are given by the geometric relative orbital elements. This ellipse defines a right-hand orthogonal coordinate system that are called the "apocentral coordinates" (by analogy to the perifocal coordinates of gravitating body orbit mechanics), in which the origin is the center of the ellipse, the major axis (apse) provides the first reference axis, the perpendicular in the relative orbital plane provides the second axis, and normal to that plane provides the third axis.

The center of the ellipse is not necessarily at the primary; in fact any displacement of it in-track is a valid relative orbit. The displacement of the center of the ellipse $$y_c = y - \frac{2\dot{x}}{n} \tag{2}$$

is a constant of motion. In general the analysis is accomplished using dimensionless quantities, so ratios are used instead of lengths. The in-plane semiminor axis, a constant of motion, is related to the Cartesian coordinates $$b = \sqrt{x^2 + \left(\frac{y - y_c}{2}\right)^2} \tag{3}$$

and will serve as the scale. The two scalars $y_c$ and b define the motion in the primary orbital plane by setting the location and size.

In the third dimension, orthogonal to the primary plane along the $\hat{k}$ axis, the relative orbital plane is defined by two more constants. The amplitude ratio $\eta$ is defined as $$\eta = \frac{1}{b}\sqrt{z^2 + \left(\frac{\dot{z}}{n}\right)^2} \tag{4}$$

and the phase difference $\Xi$, is defined as $$\Xi = \arctan(nz, \dot{z}) - \arctan(-3nx - 2\dot{y}, \dot{x}), \tag{5}$$

using the two-argument arctangent to obtain the correct quadrant.

The state of a spacecraft in periodic relative motion about another in an inertial circular orbit can be completely described with the four scalars b, $y_c$, $\eta$, and $\Xi$. All the remaining geometric terms can be defined in terms of these four.

The transformation from the RSW frame to the apocentral coordinate system is given by a rotation ($\eta, \Xi$) and a translation defined by $y_c = y - 2\dot{x}/n$, which is a constant of motion, $$r_{apoc} = \mathfrak{R}(\eta, \Xi)(r - r_c) \tag{6a}$$

$$r_c = \hat{j} y_c \tag{6b}$$

$$\mathfrak{R}(\eta, \Xi) = \mathfrak{R}_{align} \mathfrak{R}_{RSW} \tag{6c}$$

with rotations $$\mathfrak{R}_{RSW}(\eta, \Xi) = \begin{bmatrix} 0 & \frac{2}{X} & \frac{\eta\sin\Xi}{X} \\ \frac{X}{Z} & \frac{2\eta^2\sin\Xi\cos\Xi}{XZ} & \frac{4\eta\cos\Xi}{XZ} \\ \frac{2\eta\cos\Xi}{Z} & \frac{\eta\sin\Xi}{Z} & -\frac{2}{Z} \end{bmatrix}. \quad (7)$$

and $$\mathfrak{R}_{align}(\eta, \Xi) = \begin{bmatrix} \cos\varpi & \sin\varpi & 0 \\ -\sin\varpi & \cos\varpi & 0 \\ 0 & 0 & 1 \end{bmatrix}. \quad (8)$$

The magnitudes X and Z are defined by $$X = \sqrt{4 + \eta^2 \sin^2\Xi}, \quad (9a)$$

$$Z = \sqrt{4 + \eta^2(1 + 3\cos^2\Xi)}. \quad (9b)$$

The pitch ω is the angle in the relative orbital plane between the apse line and the local horizontal ($\hat{j}$-$\hat{k}$ plane), $$\omega = \arctan\left(\frac{Z\sin\tau_{max}}{X^2\cos\tau_{max} + \eta^2\sin\Xi\cos\Xi\sin\tau_{max}}\right) \quad (10)$$

with the value of the phase at the extremum $$\tau_{ext} = \frac{1}{2}\arctan(\eta^2\sin2\Xi, 3 - \eta^2\cos2\Xi) \quad (11)$$

$$\tau_{max} = \tau_{ext} + s\frac{\pi}{2}, \quad (12)$$

where s=0 if the extremum is a maximum $$\eta^2 \cos 2(\Xi + \tau_{ext}) < 3 \cos 2\tau_{ext} \quad (13)$$

and ±1 if a minimum, so that −π/2≤ω≤π/2.

The semimajor and semiminor axis of the ellipse are expressed in terms of the b, η, and Ξ as well, $$A = \frac{b}{X}([4\cos\tau_{max} + \eta^2\sin\Xi\sin(\Xi + \tau_{max})]\cos\omega + Z\sin\tau_{max}\sin\omega), \quad (14a)$$

$$B = \frac{b}{X}([4\sin\tau_{max} - \eta^2\sin\Xi\cos(\Xi + \tau_{max})]\sin\omega + Z\cos\tau_{max}\cos\omega). \quad (14b)$$

The phase angle on orbit is measured with $$\tau = \arctan(-3nx - 2\dot{y}, \dot{x}). \quad (15)$$

which is zero at τ=0 when the secondary is in the local horizontal in front of the primary and increases linearly in time at the rate of the primary's mean motion n. When τ=$\tau_{max}$, the secondary is the furthest from the primary.

FIG. 3 is a plot of relative motion in the relative orbital plane with η=2.0 and Ξ=137.5 degrees. When the secondary is at $r_{max}$, then τ=$\tau_{max}$ and θ=0. In particular, FIG. 3 shows relative orbital motion in its own plane, showing rotation from horizontal $\hat{X}$ to maximum radius r. The +$\hat{X}$ axis lies in the direction of motion ($\hat{j}$), and the $\hat{Y}$ axis is perpendicular to it in the relative orbital plane (and so is not necessarily radially upward).

There are two important differences between the inertial and relative motion. First, the ellipse describing the motion can be anywhere along the in-track direction, as reflected in the parameter $y_c$, but the inertial orbital ellipse must have its focus at the gravitational center of the gravitating body. The second is that any combination of values of inertial orbital elements is possible, but the geometric relative orbital elements are constrained in ways explained in L. M. Healy and C. G. Henshaw, "Passively safe relative motion trajectories for on-orbit inspection", AAS 10-265, pp. 2439-2458, (2010), although they were called "centered relative orbital elements" in Healy et al. As a result, on the one hand, the complete freedom of inertial motion (for example, orbits of any inclination can be of any eccentricity) is absent, but the ability to shift the center is a significant bonus.

The Three-Point Periodic Boundary Value Problem

The problem to be solved is the following: given two position vectors in time order i, j, in the RSW coordinates of the secondary relative to the primary, with the primary in a circular orbit, find the following:

(a) the relative orbit that connects the points and returns to the first point after one orbital period, as expressed by the four parameters b, $y_c$, η, and Ξ, (b) the phase change proportional to the elapsed time between the points on this relative orbit, Δτ=nΔt, and (c) the relative velocity vectors at these points on this relative orbit.

This is the three-point periodic boundary value problem for relative motion about a circular orbit; the three points are $r_0$, $r_1$, and $r_0$ again one orbital period later. It is an analogue for relative motion of the famous Lambert problem, described, for example, in John E. Prussing and Bruce A. Conway, Orbital mechanics, Oxford University Press, New York, 1993. In the Lambert problem, there is one degree of freedom: the semimajor axis may be varied (within limits) to get different elapsed times, orbits, and endpoint velocities, for the same pair of points. Here however, as we shall see, there is no such freedom; once the points are specified, there is a single relative orbit connecting them and the time elapsed between $r_0$ and $r_1$ may be found.

In the apocentral coordinate frame, the relative motion is described by a centered axis-aligned ellipse with semimajor axis length A and semiminor axis length B, with phase angle θ=τ−$\tau_{max}$ uniformly in time ($\dot{\theta}$=n), $$r_{apoc} = \begin{bmatrix} A\cos\theta \\ B\sin\theta \\ 0 \end{bmatrix}_{apoc}. \quad (16)$$

Motion of the secondary is confined to the first two coordinates; that is, they describe the figure plane. Use the transpose of $\mathfrak{R}$ to find the Cartesian position, taking advantage of the fact that a rotation is an orthogonal transformation, $$r = \mathfrak{R}^T(\eta,\Xi) r_{apoc} + r_c, \quad (17)$$

and using the offset vector for the displacement of the center relative to the primary (shown in two dimensions in FIG. 2) from Equation (6b), $$r_c = \begin{bmatrix} 0 \\ y_c \\ 0 \end{bmatrix}, \quad (18)$$

with the secondary periodic ($x_c=0$), this is constant in time. The velocity $\dot{r}$ is computed by differentiation of Equation (16) and Equation (17), noting that the apocentral transformation is independent of time, $$\dot{r}_{apoc} = n \begin{bmatrix} -A\sin\theta \\ B\cos\theta \\ 0 \end{bmatrix}_{apoc} \quad (19)$$

and $$\dot{r} = \Re^T(\eta, \Xi)\dot{r}_{apoc}. \quad (20)$$

Thus, the position and velocity at any time can be found it if the four parameters and time, as represented by $\theta$, are known. Next, compute these parameters given position vectors at two different times.

Scale and Offset

Assuming position vectors $r_i$ and $r_j$ are known at two different times, one can find the elements within the primary orbital plane, the scale b, offset $y_c$, and the phase $\Xi$ on the ellipse. The scale (in-plane semiminor axis) b may be computed with Equation (8) for either point. To find the offset $y_c$, compute the scale b for each point $r_0$, $r_1$ and set them equal:

$$b = \sqrt{x_0^2 + \frac{1}{4}(y_0 - y_c)^2} = \sqrt{x_1^2 + \frac{1}{4}(y_1 - y_c)^2}, \quad (21)$$

since b is constant over the initial orbit. Squaring this expression and rearranging gives, $$\frac{1}{4}[y_0^2 - 2y_0 y_c - (y_1^2 - 2y_1 y_c)] = x_1^2 - x_0^2, \quad (22)$$

and solving for $y_c$ gives $$y_c = \frac{4(x_1^2 - x_0^2) + y_1^2 - y_0^2}{2(y_1 - y_0)}. \quad (23)$$

Note that no solution is available if $y_0 = y_1$.

Relative Orbital Plane

The two known points, $r_0$ and $r_1$, define the relative orbital plane. This plane is most conveniently specified by its normal N, with $$\hat{N} = -\text{sgn}(\xi) \frac{(r_0 - r_c) \times (r_1 - r_c)}{|(r_0 - r_c) \times (r_1 - r_c)|}, \quad (24)$$

with $\xi = [(r_0 - r_e) \times (r_1 - r_e)] \cdot \hat{k}$. This vector is normalized, although the magnitude doesn't matter. The third component of this vector must be negative because all relative orbits revolve around the primary in the opposite sense of how the primary revolves around the earth; there is no "short way" or "long way" choice as there is in the Lambert problem.

In terms of the relative amplitude $\eta$ and phase difference or "relative phase" $\Xi$, the normal to the relative orbital plane is given by $$Z = \begin{bmatrix} 2\eta\cos\Xi \\ \eta\sin\Xi \\ -2 \end{bmatrix}. \quad (25)$$

Therefore the relative amplitude $\eta$ and phase difference $\Xi$ may be computed from a normal N of any magnitude, $$\Xi = \arctan(2N_j, N_i) \quad (26a)$$

$$\eta = \sqrt{\frac{N_i^2 + 4N_j^2}{N_k^2}}. \quad (26b)$$

Note that the values of relative amplitude $\eta$ and phase difference are independent of the magnitude of the vector $N=|N|$. If the two points, when projected into the primary orbital plane are colinear, a solution is not possible. This is the reason for the note above to avoid $\Delta\tau=\tau$ or multiples. It is possible to pick the solution connection two vectors pointing in the opposite directions from the center by declaring the plane that they have in common. If the two projected centered vectors on the same line and point in the opposite direction, a solution is physically possible only if the components in the $\hat{k}$ direction have the same magnitude with the opposite sign. However, the cross product will be zero.

From the two parameters $\eta$ and $\Xi$, the pitch $\omega$, and the apocentral transformation, the semimajor axis A, the semiminor axis B, and $\tau_{max}$ can be calculated. Also available are the eccentricity e, the slant $\sigma$ (the angle between the relative and primary orbital planes), the elevation of the node $\Gamma$ (the angle from the local horizontal plane to the intersection of the relative and primary orbital planes), though they are not needed for the immediate calculation. As discussed in later paragraphs, the orbital phase $\theta$ is then computed at either the initial or final point, and the velocity is then found from Equation (19). The gives the complete relative orbital state.

In picking a final point, to pick the $\hat{k}$ component of final position vector 1, we might pick values that have a certain relative orbital plane. As with the $\hat{i}$, $\hat{j}$ components, the value can be picked to satisfy certain constraints (like collision avoidance) or optimize a parameter, such as time or delta-V usage. This will be discussed in the maneuvers section below.

Orbital Phase

The orbital phase $\theta=\tau-\tau_{max}$ is proportional to the time elapsed since the secondary passed the major axis (FIG. 3) or apse; the constant of proportionality n is the primary mean motion (the mean motion of the primary orbit, computed by $n=\sqrt{\mu/a^3}$, where $\mu$ is the gravitational constant of the earth 398600 km$^3$/s$^2$. The constant of proportionality n is analogous to the mean anomaly in inertial orbit mechanics. Compute the apocentral vector $r_{apoc}$ using the apocentral transformation in Equation (6a) as $$r_{apoc} = \Re(\eta, \Xi)(r - r_c), \quad (27)$$

and then solve for the angle by using the first two components of apocentral position vector from Equation (16), $$\theta = \arctan(Ay_{apoc}, Bx_{apoc}), \quad (28)$$

using the two-argument arctangent. The time elapsed for the secondary to travel between the points is easily computed from the difference in orbital phase θ at the two points $r_0$ and $r_1$, $$\Delta t = \frac{\theta_1 - \theta_0}{n}. \qquad (29)$$

where the constant of proportionality n is the primary mean motion (the mean motion of the primary orbit, computed by $n = \sqrt{\mu/a^3}$, where μ is the gravitational constant of the earth (398600 km$^3$/s$^2$).

For this formula to produce the correct result, the orbital phase angle θ should be computed so that it does not decrease with time. This means that it may be necessary to add or subtract multiples of 2π to the arctangent result.

With the orbital phase angles at the endpoints $\theta_0$, $\theta_1$ now known, the velocity at those points $\dot{r}_0$, $\dot{r}_1$ (or at any other points on the orbit) may be computed with Equation (20).

Summary of Steps

The three-point periodic boundary value problem uses as its input two relative position vectors $r_0$ and $r_1$ and the mean motion of the primary n. The points must be non-colinear, not both in the local horizontal plane, and not have the same in-track position. To summarize the discussion above, the following steps can be used to solve the three-point boundary problem for the relative velocity vector at any two points in the secondary's motion:

1. Compute parameters of the in-track displacement y (with Equation (23)), the scale of the relative motion b (from either position vector using Equation (3)), the amplitude ratio η and the phase difference Ξ (Equation (26)).
2. Find the magnitudes X, Z using Equations (9a) and (9b), the phase on relative orbit at the extremum $\tau_{max}$ (with Equation (12)), the pitch ω (with Equation (10)), the semimajor axis of the relative orbital ellipse A (with Equation (14a)), and the semiminor axis of the relative orbital ellipse B (with Equation (14b)).
3. Find the apocentral transformation $\mathfrak{R}$ (with Equation (6), Equation (7), and Equation (8)).
4. Find the apocentral position vector $r_{apoc}$ (Equation (27)) for either point.
5. Find the orbital phase θ (Equation (28)) for both points.
6. Find the elapsed time Δt (Equation (29)) to travel between the two points.
7. Find the relative velocity at any point from the phase, (Equation (19)) and (Equation (20)).

The two given points must not be colinear relative to the center because Equation (24) will not solve, nor may they have common in-track components, because Equation (23) will not solve. They must not both be entirely in the local horizontal ($\hat{j}$-$\hat{k}$) plane, because the only relative orbit whose normal is entirely in the primary orbital plane is a degenerate one that passes through the primary, oscillating on either side on the $\hat{k}$ axis.

This is a closed-form analytic solution to the two point boundary value problem for closed (non-drifting) relative motion about a circular orbit without perturbations. The analogous problem in gravitating body orbit mechanics is the Lambert problem. The Lambert problem has a degree of freedom that this problem does not; it is usually expressed as the freedom to select the semimajor axis, which correspondingly affects the time. Moreover, two directions are possible in the Lambert problem, the short way and the long way, and there is no choice here. In solving the Lambert problem for a fixed time, an iteration is necessary to converge on the correct semimajor axis. No such iteration is necessary here, and there is no choice of the time. The freedom to change the time and delta-V is gained in the selection of intermediate waypoints.

Thus, referring again to FIG. 1, and using the steps 1-8 above, first solve for the relative velocity $\dot{r}_1^-$ at the known manuever waypoint $r_1$ based on the secondary's motion along the path 200 from the initial point $r_0$ to the maneuver waypoint $r_1$ using the steps 1-8 listed above. Next, solve for the relative velocity $\dot{r}_1^+$ at the same maneuver waypoint $r_1$ necessary for the secondary to reach the target waypoint $r_2$ along the path 204 from $r_1$ using the steps 1-8 listed above. The delta-V is then determined as the difference between the $\dot{r}_1^+$ and the $\dot{r}_1^-$ at the maneuver waypoint. This is discussed further in later paragraphs.

Example

Suppose it is wished that the relative orbit should pass between two points, $$r_0 = \begin{bmatrix} -1.000 \\ 3.000 \\ 1.500 \end{bmatrix} m, \; r_2 = \begin{bmatrix} 1.400 \\ -0.500 \\ -2.200 \end{bmatrix} m. \qquad (30)$$

If the primary orbits the earth at an altitude of 981.32 km, the mean motion will be [0.001] rad/s. Using Equation (23), compute the offset $y_c$=[0.7014]m. The plane normal is then computed from Equation (24) as $$\hat{N} = \begin{bmatrix} -0.8498 \\ -2.611 \times 10^{-2} \\ -0.5265 \end{bmatrix}. \qquad (31)$$

Since the third component of $\hat{N}$ is negative, the sign need not be changed. This is an indication that the angle between the vectors is less than 180 degrees going clockwise in the $-\hat{k}$ direction. From this, compute the phase difference with Equation (26) as Ξ=−176.5 degrees and the relative amplitude as η=1.617. The apocentral rotation matrix is $$\mathfrak{R} = \begin{bmatrix} 0.1628 & 0.9369 & -0.3093 \\ 0.5014 & -0.3485 & -0.7919 \\ -0.8498 & -2.611 \times 10^{-2} & -0.5265 \end{bmatrix}, \qquad (32)$$

so that the initial position vector $r_0$ in apocentral coordinates according to Equation (27) is $$r_0 = \begin{bmatrix} 1.527 \\ -2.490 \\ 0.0 \end{bmatrix}_{apoc}. \qquad (33)$$

The ellipse axis half-lengths are A=1.414 m and B=1.321 m, so the initial phase according to Equation (28) is $\theta_0$=−41.03 degrees and the final phase is $\theta_2$=113.2 degrees, which corresponds to an elapsed time Equation (39) of 44 m 52.170 s at the altitude given. The velocity at the initial time $t_0$ is then computed according to Equation (20) as $$\dot{r}_0 = \begin{bmatrix} 1.149 \times 10^{-3} \\ 2.000 \times 10^{-3} \\ -1.954 \times 10-3 \end{bmatrix} \text{m/s}. \tag{34}$$

The results are easily checked by using the complete state (position and velocity) initial conditions in the Hill's equations solutions for a circular orbit with Equation (1) and propagating the computed time to find the given final position $r_2$.

Maneuvers

Effect of Maneuver Components in RSW Coordinate Directions

The effects of each component can be considered an impulsive maneuver on the parameters.

If delta-V points in the radial ($\hat{i}$) direction, the component of motion perpendicular to the primary orbital plane will remain the same; if the motion previously was in the primary orbital plane, it will stay that way after the maneuver. The parameters referring to motion in the primary orbital plane, b and $y_c$, will change. As a consequence, the phase difference $\Xi$ may also change. Since there is no change in the cross-track motion and b has changed, the relative amplitude $\eta$ will change. The radial center $x_c$ is unchanged, so the motion remains periodic. The change in the offset $y_c$ according to Equation (2) repositions the center and the ellipse forward or backward along the direction of motion. The change in the scale b according to Equation (3) and the center happen in such a way that the projection of the point of impulse on the primary orbital plane is common to both projected ellipses shown in FIG. 2. The maneuver causes an instantaneous change in $\tau$ (Equation (15)). If there is a component of delta-V in the cross-track direction, then parameters c and $\phi$, which describe cross track motion, will change. A delta-V in the in-track direction $\hat{j}$ changes $x_c$ so that drift is induced which results in motion that is not closed, and can be complicated. Because of the complexity of analysis with drifting, this is not addressed in this discussion. Assume that $x_c$=0 before and after the maneuver.

A delta-V in the cross-track direction $\hat{k}$ changes cross-plane motion independently of the in-plane motion. Therefore, the parameters $\eta$ and $\Xi$ will change.

Delta-V Effects on Geometric Relative Orbital Elements (GROE)

The geometric relative orbital elements A, e, $\sigma$, $\Gamma$, $\omega$ describe the relative motion ellipse about its center. L. M. Healy and C. G. Henshaw, in "Passively safe relative motion trajectories for on-orbit inspection", AAS10-265, pp. 2439-2458, (2010), show that e, $\sigma$, $\Gamma$, $\omega$ depend only on $\eta$=c/b and $\Delta$ while A depends on b, refer to the geometric relative orbital elements e, $\sigma$, $\Gamma$, $\omega$ as "centered relative orbital elements (CROE)".

Any maneuver of the secondary can be analyzed as components in the RSW frame. Consider the components in the $\hat{i}$, $\hat{j}$, and $\hat{k}$ directions separately, covering the following elements:

a. radial delta-V gives change of b, $y_c$, $\psi$
b. cross-track delta-V gives change of c, $\phi$
c. combine change $\eta$, $\Xi$
d. implies change of $\sigma$, $\Gamma$
e. others: A, e, $\omega$ follow as consequence of $\eta$, $\Xi$
f. Inverse direction from GROE differences back to changes in velocity components.

Defining the relative orbital plane allows one to find the $\eta$ and $\Xi$, then from there, go up the list or down the list to find how other quantities change. In general, a higher $\eta$ means more expensive changes in phase $\Xi$, but gives better coverage of sides. To understand the relation between impulsive maneuvers in the radial and cross-track directions, and the change in parameters, first look at the motion projected in the primary orbital plane, and then the full three-dimensional motion.

Radial Delta-V

The projection of the relative orbit into the primary orbital plane can be considered to be parameterized by just two quantities: the amplitude b, and the offset $y_c$. For a single impulsive radial maneuver, there will be two sets of such parameters, the "before" indicated with a superscript "−" and after with superscript "−"; e.g., $b^-$, $b^+$ are the initial and final scales, respectively. From these values, one can compute the radial delta-V needed to effect the maneuver. Effects on the other orbital elements can also be computed. Finally, how a given radial delta-V changes these parameters is considered.

In this section, find the radial delta-V given the change in offset $y_c$, and that in turn is computed knowing two points of the segment $(x_i, y_i)$ and $(x_j, y_j)$ through which the trajectory passes, provided the in-track positions are different, $y_i \neq y_j$.

Using Equations (11a) and (10b) of L. M. Healy and C. G. Henshaw, "Passively safe relative motion trajectories for on-orbit inspection", AAS 10-265, pp. 2439-2458, (2010), with $x_c$=0, find the velocity in the $\hat{i}$ direction of the RSW reference frame shown in FIG. 3 as $$\dot{x} = nb\cos(\psi + nt) = n\frac{y - y_c}{2} \tag{35}$$

with n being the mean motion of the primary Therefore, the radial delta-V is related to the change in offset $\Delta y_c = y_c^+ - y_c^-$, and the change in velocity is $$\Delta \dot{x} = \frac{1}{2}n(y_c^+ - y_c^-) = \frac{1}{2}n\Delta y_c. \tag{36}$$

To find the offset before and after a maneuver, it is only necessary to have a pair of points for each orbit; for an impulsive maneuver, they can have the relative position at the point of maneuver in common. For example, in FIG. 2B, the point in common can be a maneuver waypoint $r_1$.

Cross-Track Delta-V

The cross-track delta-V and changes to the cross-track amplitude c are considered next. The amplitude ratio $\eta$ is affected by the cross track amplitude c, and consequently, the relative ellipse semimajor and semiminor axes A, B are also affected. The cross track amplitude also affects the slant $\sigma$ and pitch $\omega$. Using Equation (13f) of L. M. Healy and C. G. Henshaw, "Passively safe relative motion trajectories for on-orbit inspection", AAS 10-265, pp. 2439-2458, (2010), the cross-track velocity z is dependent on c=b$\eta$ and $\Xi$ as:

$$\dot{z} = nb\eta \cos(\Xi + \tau). \tag{37}$$

Therefore, if the new and old values of these quantities are known, cross-track delta-V can be computed as $$\Delta \dot{z} = nb[\eta^+ \cos(\Xi^+ + \tau) - \eta^- \cos(\Xi^- + \tau)]. \tag{38}$$

Note that this assumes no radial component to the delta-V; if there is such a component, then both b and $\tau$ would change as well.

Changing a Single Orbital Parameter

There are four parameters through which one can completely describe a periodic relative orbit: b, $y_c$, $\eta$, and $\Xi$. By analogy with gravitating body orbit mechanics in which the orbital maneuvers first studied are those that change only one orbital element, it is useful to consider first those that change only one of these parameters. Where the initial and final relative orbits have intersection points, only a single impulsive thrust is necessary to accomplish the maneuver. Where they do not, at least two separate thrusts are required, and there will be one or more intermediate transfer orbits that the secondary must be on for some period of time. Here, one can consider a single transfer orbit for each case, because if an orbit can be found that connects any two points, it will not be necessary to search for an intersection point if there is one.

Figure 4A:
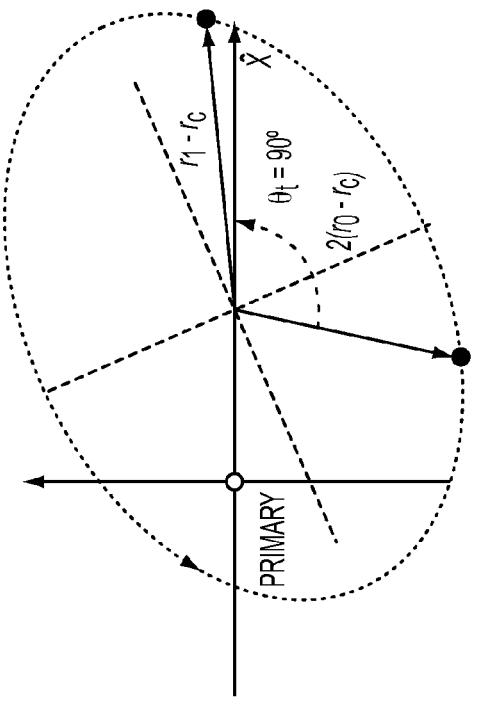
FIG. 4A-4D illustrate changing a single orbital parameter, by resizing the orbit by a factor of two.
Figure 4B:
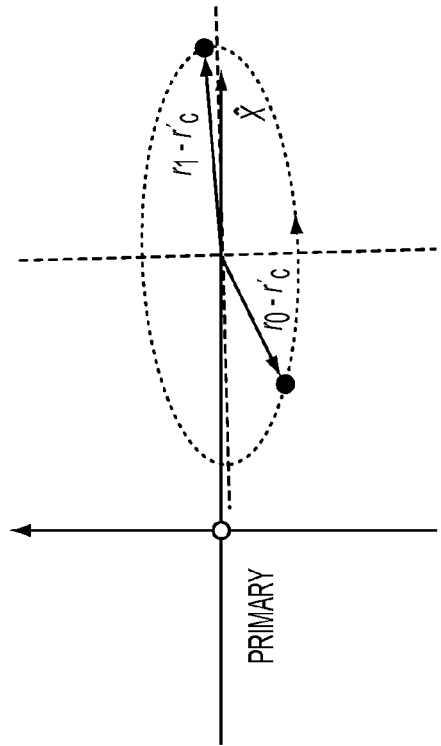

A conceptually simple way to avoid an obstacle while maintaining the same directional views of the primary is to resize the orbit but maintain its center and relative orbital plane, as shown in FIG. 4A-4D. This will require two maneuvers, like a Hohmann transfer. Start with two known points $r_0$ and $r_1'$, as seen in FIG. 4A, to define the relative orbit, and solve the boundary value problem to find the velocity when the secondary is at the first point. The first point is called $\dot{r}_0^-$, as it will be the velocity immediately before maneuvering at this point. With the computed values of $y_c$, $\eta$, and $\Xi$ retained, rescale b by a scalar $\alpha$, for example, by doubling. There is now a point $r'_0 = \alpha r_0$ on the same radial line from the center as $r_0$ as seen in FIG. 4B; so compute the rest of the quantities from step 2 onward in the summary of steps above. Next, pick some phase change for the transfer orbit $\Delta\theta_i$ to propagate on this orbit from $r_0$; call the new point $r_1$ and its velocity $\dot{r}_1^+$. Next, solve the boundary value problem again, this time between $r_0$ and $r_1$. The computed relative velocity at $r_0$ on this orbit we will call $\dot{r}_0^+$, and propagating this transfer orbit, the velocity at $r_1$ is $\dot{r}_1^-$. Finally, the delta-Vs are $$\Delta\dot{r}_0 = \dot{r}_0^+ - \dot{r}_0^- \quad (39a)$$

$$\Delta\dot{r}_1 = \dot{r}_1^+ - \dot{r}_1^- \quad (39b)$$

$$\Delta v = |\dot{r}_0| + |\dot{r}_1|. \quad (39c)$$

Figure 4C:
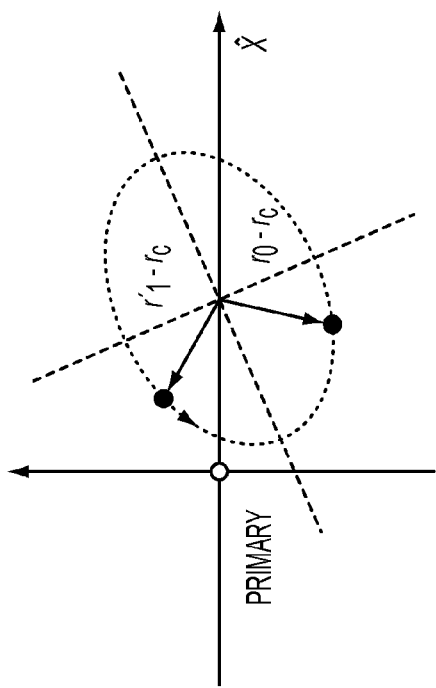
Figure 4D:
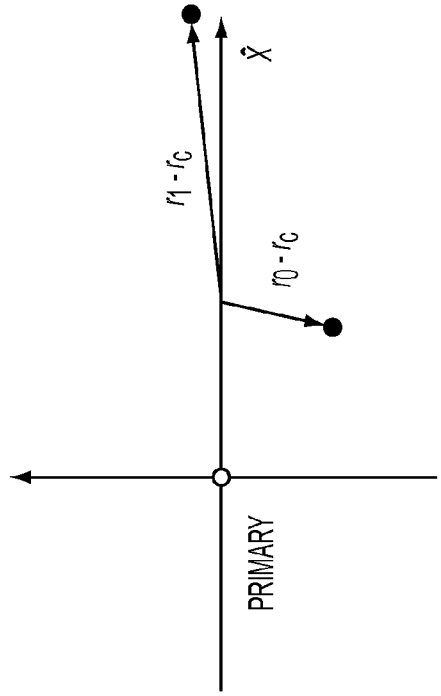

The time of transfer may be computed from Equation (29). FIGS. 4A and 4B are shown in the same relative orbital plane of the initial or final orbit. FIG. 4C shows the two points defining the transfer orbit in the same relative orbital plane of the initial and final orbits, and FIG. 4D shows the two points defining the transfer orbit, in the relative orbital plane of the transfer orbit.

For one example, suppose it is desired to double the size of the orbit, with $\alpha=2$.

If the initial position is $$r_0 = \begin{bmatrix} -1.000 \\ 3.000 \\ 1.500 \end{bmatrix}, \quad (40)$$

In this initial orbit, the scale is b=1.008 m, so when doubled, b will be b=2.016 m. At the point $r_0$, the position and velocity on the initial orbit are $$r_0 = \begin{bmatrix} -1.000 \\ 3.000 \\ 1.500 \end{bmatrix} \text{m}, \dot{r}_0 = \begin{bmatrix} 0.1250 \\ 2.000 \\ -1.125 \end{bmatrix} \text{mm/s}, \quad (41)$$

and a maneuver is executed based on a destination position $r_1$ found by propagating the final orbit by a phase $\Delta\theta_i=90$ from the rescaled point $r_0$, $$r_1 = \begin{bmatrix} 0.2500 \\ 6.750 \\ -2.250 \end{bmatrix} \text{m}, \quad (42)$$

with a delta-V computed by taking the difference of the velocities on the two orbits, $$\Delta\dot{r}_0 = \dot{r}_0^+ - \dot{r}_0^- = \begin{bmatrix} -0.6875 \\ 2.000 \\ -1.687 \end{bmatrix} - \begin{bmatrix} 0.1250 \\ 2.000 \\ -1.125 \end{bmatrix} = \begin{bmatrix} -0.8125 \\ 0.0 \\ -0.5625 \end{bmatrix} \text{mm/s}. \quad (43)$$

After a phase change of $\Delta\theta=136.4$ (39 m40.580 s at our standard altitude) on the transfer orbit, e another maneuver is executed with the delta-V $$\Delta\dot{r}_1 = \dot{r}_1^+ - \dot{r}_1^- = \begin{bmatrix} 2.000 \\ -0.500 \\ -3.000 \end{bmatrix} - \begin{bmatrix} 1.188 \\ -0.500 \\ 0.1875 \end{bmatrix} = \begin{bmatrix} 0.8125 \\ 0.0 \\ -3.187 \end{bmatrix} \text{mm/s} \quad (44)$$

at the point.

The total delta-V is $\Delta v = [4.278 \times 10^{-3}]$m/s and the total elapsed time for the transfer is 39 m 40.580 s.

Changing the Center

Analogous to resizing, it is also possible to change the in-track center by a fixed displacement $\delta$. Again, start with $r_0$ and $r_1'$ to define the relative orbit, and solve the boundary value problem. Retain the computed value of the scale b and substitute for the offset $y_c = y'_c + \delta$, and keep $\eta$, and $\Xi$. The calculations proceed as before, resulting in delta-Vs and time of transfer.

Changing the Amplitude Ratio

The amplitude ratio $\eta$ can be changed solely by a delta-V in the cross track ($\hat{k}$) direction, if b is kept constant. Since the elevation of the node is independent of $\eta$, both the initial and final orbits will cross the primary orbital plane at the same point, so a single impulsive thrust can be performed at that point.

In the RSW coordinate frame, the scaled position and velocity of the secondary are given in Equations (16) and (18) of L. M. Healy and C. G. Henshaw, "Passively safe relative motion trajectories for on-orbit inspection", AAS 10-265, pp. 2439-2458, (2010), as $$\frac{r}{b} = \begin{bmatrix} \sin\tau \\ 2\cos\tau \\ \eta\sin(\Xi+\tau) \end{bmatrix}, \frac{\dot{r}}{bn} = \begin{bmatrix} \cos\tau \\ -2\sin\tau \\ \eta\cos(\Xi+\tau) \end{bmatrix}. \quad (45)$$

If for some integer m, $\tau = m\pi - \Xi$, then the third component of r is zero. In that case, the third component of the velocity is $(-1)^m nb\eta$. While an amplitude ratio $\eta$ change will change the plane normal, from Equation (25) it can be seen that it does not change the phase difference $\Xi$. Therefore, if for some value of $\Delta\eta$ the delta-V $$\Delta v_z = (-1)^m nb\Delta\eta \qquad (46)$$

is executed when $\tau = m\pi - \Xi$ for an integer m, then the amplitude ratio will change by $\Delta\eta$, and b, $y_c$, and $\Xi$ will remain constant.

Changing the Phase Difference

Finally, changing the phase difference $\Xi$ also changes the plane. We can do it in two maneuvers. Again, start with $r_0$ and $r_1'$ to define the relative orbit, and solve the boundary value problem. Retain the computed value of the scale b, offset $y_c$, and $\eta$, and replace the value of $\Xi$. The calculations proceed as discussed above, resulting in delta-Vs and time of transfer.

Feasible and Optimal Trajectories

There are two goals to consider when designing the trajectory of a secondary acting as an inspector of the primary: collision avoidance and coverage. Coverage of the primary is the set of directions from the primary through which the secondary passes. The goal may be imaging of a single part of the surface of the primary, or imaging all over the surface.

Collision avoidance means that the trajectory does not pass through any parts of the primary. If the primary and secondary are spheres, a solution is easy: any relative orbit whose minimum distance from the center is greater than the sum of the radii of the primary and secondary is safe. If they are not spheres, safety can be ensured by imagining a safety sphere enveloping each that has a radius at least as large as the largest distance from the center of every point on the spacecraft. However, if one wants the secondary to come closer to the primary, say for inspection purposes, that procedure won't work.

A trajectory is passively safe if the relative orbit does not intersect with the host. In the absence of any maneuver then, it will stay on the safe trajectory. To maximize safety, we should minimize the number of impulsive maneuvers, on the premise that the greatest chance for failure is at a maneuver. There are two possible failure scenarios at a maneuver: the more likely in our assumption is that nothing happens; there is no delta-V as desired. Because of the design of the non-maneuvering relative orbit, this event (or non-event) is harmless: the secondary stays on its safe relative orbit, though perhaps without achieving an imaging goal. The other failure scenario is that the actual delta-V is not the commanded delta-V; a misfire. This could well put the secondary on a collision course, and there is little from a trajectory design perspective that can be done to prevent this, other than to minimize the risk by minimizing the number of maneuvers.

We have assumed here that there is no in-track maneuvering, as this results in a orbit for the secondary that has different orbital period than the primary, and they separate secularly (actually, relative motion is periodic with the synodic period). One way to keep the pair together is to counteract the in-track maneuver with an opposite maneuver at a later time. However, the trajectory may not be passively safe.

One approach to collision avoidance for very close motion is to find the cross section of the secondary on the relative orbital plane. The relative orbital plane can be thought of slicing through space, and through the primary, so that we can see a relative orbit around a cross-section of the primary, such as is shown in FIG. 1. If the maneuver will preserve the relative orbital plane, then compute a plane-preserving shift and/or scale and test whether the ellipse intersects the primary. If it will change the plane (i.e. one or both of $\eta$ and $\Xi$) for an attitude-stabilized primary, then a new cross-section of the primary will be needed to determine the obstacles to be avoided, and the new ellipse should be tested for intersection.

If the primary is rotating in the RSW frame, planning a trajectory for direction and for collision avoidance for very close motion will be much harder. There is possibly some benefit to simplifying the trajectory; for example, if the primary is spinning about its velocity vector $\hat{j}$, then if the secondary stays in the primary orbital plane, it will see all directions on the primary (presuming the spin and orbital periods are not commensurable).

Example

In a previously described example in which the relative orbit was doubled, the free parameter, $\Delta\theta_f$, was chosen to be 90 degrees. This parameter can be adjusted and the trajectory recalculated, with the results of the delta-V and the time plotted in FIG. 5 and FIG. 6, respectively. If there are obstacles on the transfer orbit, a new trajectory may avoid them. Time on the transfer orbit and/or fuel used may be an issue as well.

Figure 5:
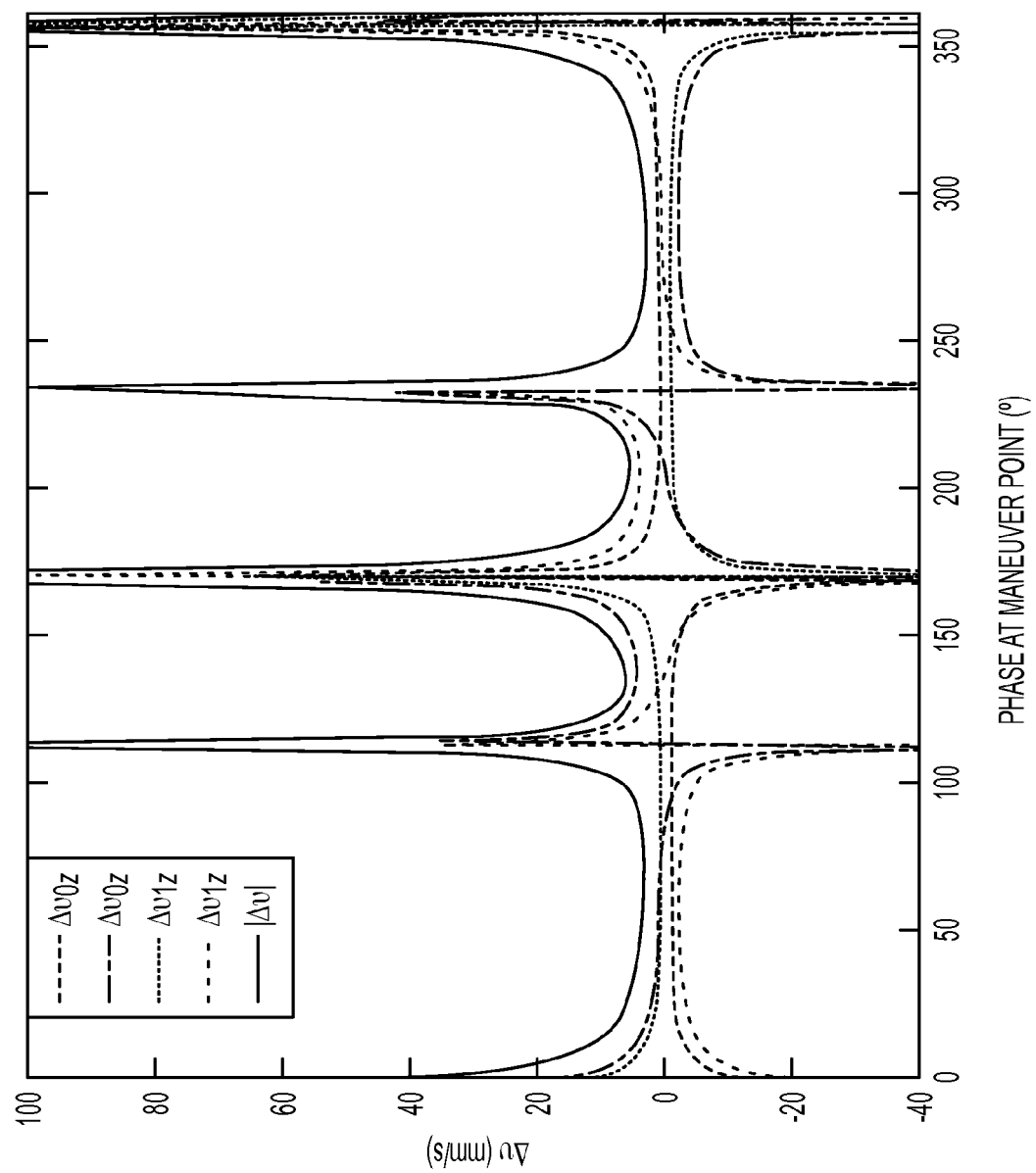
FIG. 5 is a plot of delta-V versus phase at a maneuver point for various phases and velocities.
Figure 6:
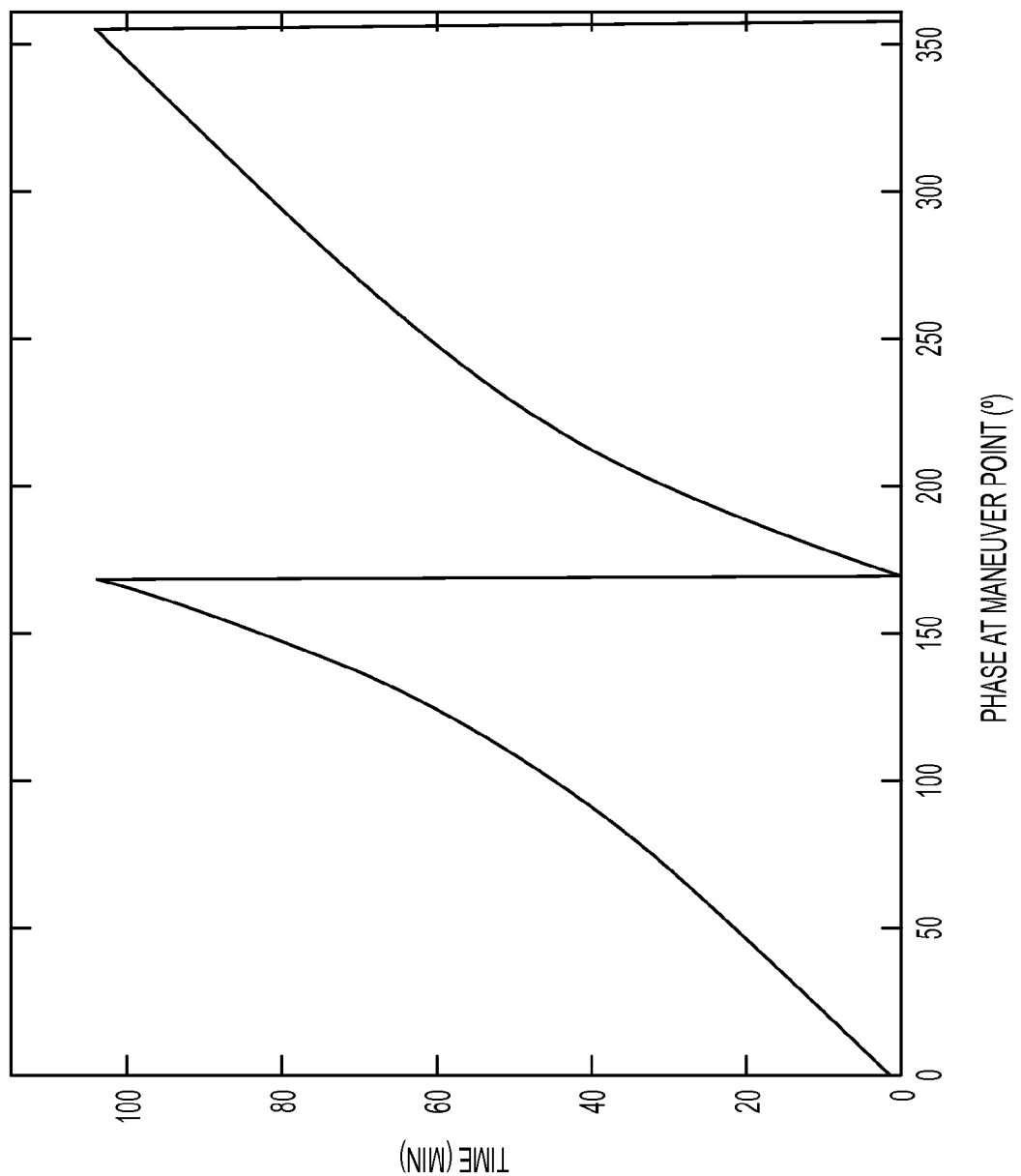
FIG. 6 is a plot of maneuver time versus phase at a maneuver point.

Note that a proposed maneuver can be evaluated for fuel efficiency by examining the many points that form FIG. 5. For example, the peaks in the curve for $\Delta v$ are the points that require the most thrust. Therefore, it would be wise to avoid the regions around the peaks, and select a phase at the maneuver point at which the $\Delta v$ is low. Similarly, the time required to complete a maneuver for each phase at the maneuver point is shown in FIG. 6. The two plots can be used together to select an appropriate phase at the maneuver point.

The method and system described herein can plan a trajectory for relative motion where the primary is in a circular orbit, the secondary in a periodic (non-drifting) orbit relative to it, there are no perturbations acting, and the linear approximation (as used to derive Hill's equations) holds. Maneuver points at which external forces are applied impulsively are alternated propagation with no external forces. The maneuvers include only radial and cross-track components (there is no in-track component), so that throughout the trajectory, the orbit is periodic. Between every pair of points, we solve the three-point periodic boundary value problem for relative motion, the solution for which we have presented here based on our previous work. This solution is unique and an analytical function of its arguments. Once the velocities are computed at the maneuver points, the delta-Vs are easily obtained by computing a vector difference.

The waypoints may be chosen so that the secondary avoids collisions, so that it has desired directional properties relative to the primary, so that fuel usage may be minimized, or so that transfer time is a desired value. If, for example, it is desired that the secondary follow a certain trajectory relative to the primary, the waypoints may be chosen freely such that the trajectory satisfies those constraints. For example, in doubling the size of the relative orbit, the target point for the second maneuver may be varied over its orbit, and the resulting transfer trajectories have very different delta-Vs, time of transfer, and potential for collision.

Any desired trajectory can be achieved with a sufficiently fine filling of waypoints. For example, suppose that an inspector needed to travel along a long flat surface, staying approximately a constant distance away from that surface. A natural orbital motion would be an arc, and therefore not uniformly distant. Bisecting the length of the surface with a point at the right distance would give two arcs, better, but likely still not enough. Bisecting each of those with points would produce better results, and successive bisections would eventually yield an emulation of a straight line with small arcs sufficient to achieve the requirement of near-constant distance. In this analysis, we assume the only force on the two spacecraft is the planetary central gravitation. Clearly, differential perturbations will change these results somewhat, and it is believed that the algorithms presented here can be generalized to accommodate them. Likewise, the circularity of the primary orbit and linearity approximation may prove significant in some circumstances when generalizing this technique.

This method has several differences and advantages over previous approaches.

The techniques that are based on classical astrodynamics have both advantages and disadvantages. Starting as it does with classical astrodynamics techniques, it results in trajectories that explicitly take orbital dynamics into account, and do not require the co-orbiting spacecraft to expend fuel to travel in un-natural ways such as following straight lines. It also tends to result in solutions that are amenable to implementation with existing spacecraft propulsion systems, which are typically considered impulsive. Unfortunately, this approach also has significant limitations. Foremost among these is that it does not treat the case where the two spacecraft must operate at ranges closer than their circumscribing spheres allow. For instance, a GEO satellite may have twin solar panels as long as 25 meters, which implies that its circumscribing sphere is at least 50 meters in diameter; this implies that classic approaches to proximity operations trajectory planning cannot produce solutions that allow proximity operations closer than 50 meters for such a spacecraft.

The terrestrial robotics approach also has several important disadvantages when applied to spacecraft. Primary among these is that the terrestrial robotics community often (although certainly not always) ignores system dynamics; instead, it is assumed that the robot is capable of accurately tracking any given trajectory, even a trajectory that is only piecewise linear, so closely that dynamic effects can be ignored. Adapting a classical terrestrial robotics trajectory planning approach for co-orbiting spacecraft would require ignoring orbital dynamics and assuming that the inspection spacecraft is assumed to have enough control authority and on-board fuel to perform essentially any delta-V.

Thus, neither of these classes of solutions is entirely satisfactory. Techniques which can generate paths that satisfy orbital dynamic constraints and allow very close approach distances are needed.

The present method provides a new way of specifying the motions of one spacecraft relative to another, in which the mathematical space in which relative satellite motion can be intuitively understood, and relatively complex geometric obstacle constraints can be easily expressed. The method adapts terrestrial trajectory planning techniques in such a space to produce trajectories having both the fuel efficiency of classic astrodynamics and the close approach distances allowed by classic robotics trajectory planning The method described herein can be implemented on a computer, and the thrust vectors are input to the inspection satellite control system, which in turn controls the inspection vehicle velocity and position in space. Feedback can be provided to the computer, including positional information from a communications link with one or both satellites, global positioning satellite data, or other information.

Initial trajectory planning can be accomplished on a ground-based computer, or even on the host satellite computers. It may be necessary to periodically re-calculate the trajectories, in order to compensate for off-course position or to reinspect a particular portion of the host satellite.

Embodiments of the present invention may be described in the general context of computer code or machine-usable instructions, including computer-executable instructions such as program modules, being executed by a computer or other machine, such as a personal data assistant or other handheld device. Generally, program modules including routines, programs, objects, components, data structures, and the like, refer to code that performs particular tasks or implements particular abstract data types. Embodiments of the invention may be practiced in a variety of system configurations, including, but not limited to, handheld devices, consumer electronics, general purpose computers, specialty computing devices, and the like. Embodiments of the invention may also be practiced in distributed computing environments where tasks are performed by remote processing devices that are linked through a communications network. In a distributed computing environment, program modules may be located in association with both local and remote computer storage media including memory storage devices. The computer useable instructions form an interface to allow a computer to react according to a source of input. The instructions cooperate with other code segments to initiate a variety of tasks in response to data received in conjunction with the source of the received data.

Computing devices includes a bus that directly or indirectly couples the following elements: memory, one or more processors, one or more presentation components, input/output (I/O) ports, I/O components, and an illustrative power supply. Bus represents what may be one or more busses (such as an address bus, data bus, or combination thereof). One may consider a presentation component such as a display device to be an I/O component. Also, processors have memory. Categories such as "workstation," "server," "laptop," "hand held device," etc., as all are contemplated within the scope of the term "computing device."

Computing devices typically include a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, or any other tangible physical medium that can be used to encode desired information and be accessed by computing device.

Memory includes non-transitory computer storage media in the form of volatile and/or nonvolatile memory. The memory may be removable, nonremovable, or a combination thereof. Exemplary hardware devices include solid state memory, hard drives, optical disc drives, and the like. Computing device includes one or more processors that read from various entities such as memory or I/O components. Presentation component can present data indications to a user or other device. I/O ports allow computing devices to be logically coupled to other devices including I/O components, some of which may be built in.

Obviously, many modifications and variations of the present invention are possible in light of the above teachings. It is therefore to be understood that the claimed invention may be practiced otherwise than as specifically described, and that the invention is not limited to the preferred embodiments discussed above.

What is claimed is:

1. A computer implemented method for determining, with a computer processor, a required impulsive change in velocity of a secondary space vehicle with respect to a primary space vehicle at a known maneuvering waypoint to move the secondary space vehicle to a known target waypoint, the method comprising:

provide an apocentral coordinate system for orbital motion of the primary and secondary space vehicles, wherein said apocentral coordinate system is a right-hand orthogonal coordinate system defined by the ellipse of the motion of the secondary with respect to the primary in a relative orbital plane, with a primary axis being defined by a line between the primary and one of two opposite furthest points on the ellipse from the primary, a second axis being perpendicular to the first axis in the relative orbital plane, and a third axis being normal to the relative orbital plane and defined by a cross product of the primary axis and the second axis;

determining, with a computer processor, a pre-maneuver velocity vector at the maneuvering waypoint based on a pre-maneuver orbital location and velocity vector of the secondary with respect to the primary in the apocentral coordinate system;

determining, with a computer processor, a required post-maneuver velocity vector at the maneuvering waypoint required for the secondary to reach the target waypoint in the apocentral coordinate system; and determining, with a computer processor, the required impulsive change in velocity as a vector difference between the post-maneuver velocity and the pre-maneuver velocity.

2. The method according to claim 1, further comprising:
after said secondary has moved to the maneuvering waypoint, repeat said determining the pre-maneuver velocity vector, determining the required post-maneuver velocity vector, and determining the required impulsive change in velocity for a next maneuvering waypoint and a next target waypoint.

3. The method according to claim 2, further comprising:
continuing said determining the pre-maneuver velocity vector, determining the required post-maneuver velocity vector, and determining the required impulsive change in velocity for a next maneuvering waypoint and a next target waypoint until the required impulsive changes in velocity for all maneuvering waypoints have been determined.

4. The method according to claim 1, wherein the apocentral coordinate system has an origin at the location of the primary when there is no drift.

5. The method according to claim 1, wherein the method further comprises:
transforming position and velocity information from an RSW radial-transverse-normal coordinate system to the apocentral coordinate system before determining said velocity vectors.

6. The method according to claim 1, wherein the RSW coordinate system is a reference frame based on the primary's orbital motion and having a radial component ($\hat{i}$ axis), an along-track component perpendicular to the radial and in the primary's orbital plane ($\hat{j}$ axis), and a third component perpendicular to the primary's orbital plane parallel to the angular momentum ($\hat{k}$ axis).

7. The method according to claim 1, wherein said determining the pre-maneuver velocity vector includes: computing the offset $y_c$ and scale b from a position vector of an initial point or the maneuver waypoint, computing $\eta$ and phase difference $\Xi$,
computing magnitudes X and Z, a phase on relative orbit at an extremum of motion $\tau_{max}$, a pitch $\omega$, a semimajor axis length A, and a semiminor axis length B of a centered axis-aligned ellipse followed by the secondary as it moves from the initial point to the maneuver waypoint,
computing an apocentral transformation $\mathfrak{R}$,
computing an apocentral position vector for an initial point or the maneuver waypoint,
finding an orbit phase angle $\theta = \tau - \tau_{max}$ for the initial point and the maneuver waypoint;
finding an elapsed time $\Delta t$ to travel between the initial point and the maneuver waypoint; and
finding the relative velocity at the maneuver waypoint from the phase.

8. The method according to claim 7, wherein the pitch $\omega$ is the angle in the relative orbital plane between an apse line and a local horizontal ($\hat{j}$-$\hat{k}$ plane).

9. The method according to claim 1, further comprising:
inputting thrust vectors to a control system of the secondary space vehicle, the thrust vectors being proportional to the required impulsive change in velocity.

10. The method according to claim 1, further comprising:
receiving feedback including at least one of positional information from the primary space vehicle or the secondary space vehicle and positional information from global positioning satellite data.

11. The method according to claim 10, further comprising:
recalculating a secondary vehicle trajectory, said trajectory including the location of a maneuvering waypoint and a new required impulsive change in velocity at the maneuvering waypoint.

12. A non-transitory computer readable medium with computer executable instructions for: determining, with a computer processor, a required impulsive change in velocity of a secondary space vehicle with respect to a primary space vehicle at a known maneuvering waypoint to move the secondary space vehicle to a known target waypoint, said determining including:

providing an apocentral coordinate system for orbital motion of the primary and secondary space vehicles, wherein said apocentral coordinate system is a right-hand orthogonal coordinate system defined by the ellipse of the motion of the secondary with respect to the primary in a relative orbital plane, with a primary axis being defined by a line between the primary and one of two opposite furthest points on the ellipse from the primary, a second axis being perpendicular to the first axis in the relative orbital plane, and a third axis being normal to the relative orbital plane and defined by a cross product of the primary axis and the second axis;

determining, with a computer processor, a pre-maneuver velocity vector at the maneuvering waypoint based on a pre-maneuver orbital location and velocity vector of the secondary with respect to the primary in the apocentral coordinate system;

determining, with the computer processor, a required post-maneuver velocity vector at the maneuvering waypoint required for the secondary to reach the target waypoint in the apocentral coordinate system; and determining, with the computer processor, the required impulsive change in velocity as a vector difference between the post-maneuver velocity and the pre-maneuver velocity.

13. The non-transitory computer readable medium according to claim 12, wherein said instructions include instructions for:

after said secondary has moved to the maneuvering waypoint, repeating said determining the pre-maneuver velocity vector, determining the required post-maneuver velocity vector, and determining the required impulsive change in velocity for a next maneuvering waypoint and a next target waypoint.

14. The non-transitory computer readable medium according to claim 13, wherein said instructions include instructions for:

continuing said determining the pre-maneuver velocity vector, determining the required post-maneuver velocity vector, and determining the required impulsive change in velocity for a next maneuvering waypoint and a next target waypoint until the required impulsive changes in velocity for all manuever waypoints have been determined.

15. The non-transitory computer readable medium according to claim 12, wherein the apocentral coordinate system has an origin at the location of the primary when there is no drift.

16. The non-transitory computer readable medium according to claim 12, wherein the instructions further include instructions for:

transforming position and velocity information from an RSW radial-transverse-normal coordinate system to the apocentral coordinate system before determining said velocity vectors.

17. The non-transitory computer readable medium according to claim 16, wherein the RSW coordinate system is a reference frame based on the primary's orbital motion and having a radial component ($\hat{i}$ axis), an along-track component perpendicular to the radial and in the primary's orbital plane ($\hat{j}$ axis), and a third component perpendicular to the primary's orbital plane parallel to the angular momentum ($\hat{k}$ axis).

18. The non-transitory computer readable medium according to claim 12, wherein the instructions for determining said the pre-maneuver velocity vector include instructions for:

computing the offset $y_c$ and scale b from a position vector of an initial point or the maneuver waypoint; computing amplitude ratio η and phase difference Ξ; computing magnitudes X and Z, a phase on relative orbit at an extremum of motion $\tau_{max}$, a pitch ω, a semimajor axis length A, and a semiminor axis length B of a centered axis-aligned ellipse followed by the secondary as it moves from the initial point to the maneuver waypoint, computing an apocentral transformation $\mathfrak{R}$;

computing an apocentral position vector for an initial point or the maneuver waypoint;

finding an orbit phase angle $\theta=\tau-\tau_{max}$ for the initial point and the maneuver waypoint;

finding an elapsed time Δt to travel between the initial point and the maneuver waypoint; and finding the relative velocity at the maneuver waypoint from the phase.

19. The non-transitory computer readable medium according to claim 12, wherein the pitch ω is the angle in the relative orbital plane between an apse line and a local horizontal ($\hat{j}$-$\hat{k}$ plane).

20. The non-transitory computer readable medium according to claim 12, wherein the instructions include instructions for inputting thrust vectors to a control system of the secondary space vehicle, the thrust vectors being proportional to the required impulsive change in velocity.

21. The non-transitory computer readable medium according to claim 12, wherein the instructions include instructions for receiving feedback including at least one of positional information from the primary space vehicle or the secondary space vehicle and positional information from global positioning satellite data.

22. The non-transitory computer readable medium according to claim 21, wherein the instructions include instructions for recalculating a secondary vehicle trajectory, said trajectory including the location of a maneuvering waypoint and a new required impulsive change in velocity at the maneuvering waypoint.

* * * * *